United States Patent [19]

van Ulden

[11] Patent Number: 4,812,347
[45] Date of Patent: Mar. 14, 1989

[54] METHOD FOR MANUFACTURING A TAPE OF PHOTOGRAPHIC SLIDES

[76] Inventor: Petrus J. L. C. van Ulden, Gansstraat 8, 6678 BA Oosterhout, Netherlands

[21] Appl. No.: 70,161

[22] PCT Filed: Aug. 24, 1984

[86] PCT No.: PCT/NL84/00028
 § 371 Date: Apr. 12, 1985
 § 102(e) Date: Apr. 12, 1985

[87] PCT Pub. No.: WO85/01125
 PCT Pub. Date: Mar. 14, 1985

Related U.S. Application Data

[63] Continuation of Ser. No. 724,586, Apr. 12, 1985, abandoned.

[30] Foreign Application Priority Data

Aug. 26, 1984 [NL] Netherlands ............... 8302982

[51] Int. Cl.⁴ ................. B05D 5/12; E06B 9/26
[52] U.S. Cl. ........................... 428/77; 156/65; 156/70; 156/247; 156/301; 156/302; 156/344; 156/352; 156/361; 156/552; 226/8; 226/156; 355/75; 428/138; 428/172
[58] Field of Search ................... 156/247, 344

[56] References Cited

U.S. PATENT DOCUMENTS

| 2,947,217 | 8/1960 | McWhirter | 455/41 |
| 2,991,214 | 7/1961 | Burkholder | 156/301 |
| 3,870,409 | 3/1975 | Abe | 355/75 |
| 4,098,634 | 7/1978 | Harmon | 156/302 |

FOREIGN PATENT DOCUMENTS 2435063 3/1980 France .

Primary Examiner—John J. Gallagher
Attorney, Agent, or Firm—Cushman, Darby & Cushman

[57] ABSTRACT

A method of manufacturing a tape of sequential, framed photographic slide in which at least one side of each frame not containing picture information is removably fixed by an adhesive to a continuous tape which moves rectilinearly in a direction parallel to said side.

3 Claims, 2 Drawing Sheets

4,812,347

METHOD FOR MANUFACTURING A TAPE OF PHOTOGRAPHIC SLIDES

This is a continuation of U.S. patent application Ser. No. 724,586, filed Apr. 12, 1985, which was abandoned uponH the filing hereof.

BACKGROUND OF THE INVENTION

For making prints of negatives or slides it is now common practice to use a tape of sequential negatives or slides in order to obtain higher speed in printing centers, since these tapes can be practically automatically fed to an exposing machine (printer), in which all necessary processes for making prints are performed. These processes comprise inter alia the application of a code number, the assessment of the correct side to be facing the source of light, the assessment of the coverage and the colour value of the negative or positive and the control of the printing part proper with the associated light source and filters, if any, via a memory, as the case may be.

In making prints of negatives it is common practice to start by a roll film, which is passed either as a whole or in parts, for example, strips of 4 to 6 negatives, through the printing machine (printer). Since these film strips have a given amount of rigidity, it is possible to transport them as such through the printer. However, in particular in the case of miniatures one side of the negative film or part thereof is sometimes enclosed between strips and stuck thereto. These strips are then moved by a transport mechanism through the printer.

In the case of slides the question is usually quite different. Up to recent years first a so-called intermediate negative had to be made for making a print of a slide. This intermediate negative was then processed in a printing machine in quite the same manner as a normal negative. At present it is, however, possible to make a print on photographic paper directly from slides. This has offered to each client the possibility of having made a print at low price. Making an intermediate negative, as originally required, materially increases, of course, the costs of the whole process. Since a client is, in the first place, interested in slides for projection and wants a print of only a very limited number, the client usually hands framed slides to the photographer. These framed slides, hereinafter also termed frames, could be individually processes in a printing machine, since they are rigid. However, such a process would be very time-consuming. Therefore tapes, for example, of synthetic material, have been developed, which comprise a large number of sequential, relatively separated compartments in which the slide frames can be placed. Such a tape consists, in principle, of two ladder-shaped parts fastened to one another at the areas of the rungs of the ladder. The parts between the "rungs" have approximately the dimensions of a slide frame and have openings for the picture part of the slides, that is to say, the part carrying the image information. If the tape is made from synthetic material, the "rungs" of the ladders are interconnected, for example, by high-frequency welding. However, adhesives may also be used. Although the use of such tapes, when frames are placed in the compartments, allows a very high rate of the printing process proper, the great disadvantage is that the slide frames have to be slipped into the compartments. In many cases this done by hand, although it is possible to apply some mechanisation, for example, by opening the compartments by means of an air stream and by slipping the frame mechanically into the compartments. This processing step is still time-consuming.

The use of a tape of interconnected compartments as described above provides apart from the possibility of a higher rate of processing in the printer proper, the advantage that the tape can be wound or folded for transport purposes. In some cases the photographer may supply tapes to the printing center in which slide frames have already been slipped.

The tape is automatically transported in the printer. It is then necessary for each slide frame to be exactly positioned in the printer proper for making a print. In some printers this is performed with the aid of a light beam and a photo-electric cell capturing said beam after the beam has passed through the "rungs" of the tape. In this part of the tape, which is double, considerable loss of light and dispersion of the light occur. Therefore it is necessary to use an accurately directed, concentrated light beam, which requires an expensive optical system. This could be improved by providing a small aperture in the "rungs" for passing the light beam. However, this requires additional processing and it is, therefore, less recommended.

A further disadvantage of the use of such tapes is that each compartment has to be slightly larger than the dimensions of a frame, since otherwise insertion of the frames becomes even more difficult. Then, however, the place of a slide frame in a compartment is not fully fixed. This may give rise on the one hand to transport difficulties and on the other hand to prints not fully corresponding to the picture information of the slide.

A further disadvantage of the use of the known tapes is that the tapes are usually made from synthetic material and can, therefore, be only provided with indications, for example, code numbers with the aid of special felt pens. Moreover, the tapes of the kind described above are relatively expensive.

SUMMARY OF THE INVENTION

The invention relates to a method of manufacturing a tape of sequential, framed, photographic slides particularly intended for use in printers, in which the above-mentioned disadvantages are avoided for the major part and additional advantages are obtained.

A method embodying the invention for the manufacture of a tape of sequential, framed, photographic slides is characterized in that at least one side of each frame not containing picture information is stuck to a continuous tape which moves rectilinearly in a direction parallel to said side.

Although the method embodying the invention exhibits some similarity to the above-mentioned use of strips enclosing part of a negative film the great difference is that frame slides can also be effectively assembled in a tape. For framed slides the use of strips to which the frames are fixed is hitherto unknown.

For interconnecting the separate parts it is preferred to use a continuous tape covered on one side completely with an adhesive. Since there has to be given space between two separate parts, for example, two frames, the adhesive side of the tape is open at this area. This might give rise to difficulties in transport and passage through the printer. Therefore, in a particular embodiment of the present invention, after a film portion, in particular a slide frame, is fixed to the continuous tape, a second continuous tape is positioned opposite the first tape on the other side of the diapositive frame and fixed to the first tape at the side of said portion. Thus all intermediate parts are covered. It is not necessary, though possible to use a tape completely covered with adhesive for said second tape. This, however, has a disadvantage, since the film portions, for example, slide frames, must subsequently be removed from the tape. If both tapes lying opposite one another are provided with adhesive, removal is, of course, more difficult. Therefore, it is preferred to use as a second tape a strip without adhesive and, more particularly, a paper strip. On this paper strip can be indicated the desired information by a common pencil, a ballpoint or an automatic printer.

Since the film portions, for example, the slide frames are fastened only at the side edge to the adhesive tape and, as the case may be, may be covered on the opposite side by a second tape, the sides of the film portion being at right angles to the direction of this tape(s) are completely free. When such a tape is passed through the printer, it is therefore easy to define the correct position of the film portion/slide frame by means of a light beam and the associated photocell.

By the above-described method embodying the invention a continuous tape is obtained, which has sufficient rigidity to be processed in a printer, whilst it is sufficiently strong for transport after being wound or folded. However, this may be further improved in a particular embodiment of the invention by providing also the side of the film portion for example the slide frame opposite the first-mentioned side in a similar manner with at least one continuous tape. In this embodiment a continuous tape is obtained which is to some extent similar to the tapes hitherto used having compartments for receiving slides. The great difference is, however, that between the various portions or slide frames there is practically no material and that the fixation is obtained by adhesion to narrow tapes. These narrow tapes are materially cheaper, whilst the troublesome insertion into the compartments is avoided. As a result simple mechanisation is possible with the aid of a device forming part of this invention, which will be described hereinafter.

A device embodying the invention for the manufacture of a continuous tape of separated, framed parts of a photographic film is characterized in that an endless chain comprising a plurality of relatively pivotable, flat links is passed along at least two parallel, relatively spaced rollers of polygonal section, which rotate stepwise, whilst at the side of a first roller the continuous tape provided with adhesive is fed in the same direction as the direction of movement of the chain and adjoins the chain, the adhesive side being remote from the chain and is moved together with the chain, a film portion being fixed to the tape at the instant of a standstill of the chain, whilst finally the tape with adhering film portion(s) is removed from the chain after having passed along the second roller.

If, as described above, an adhesive tape is used on two opposite sides of a film portion, for example, a slide frame, two parallel tapes are used, which are spaced apart by a distance such that they leave the picture information part completely free.

When in a particular embodiment described above countertapes are applied and fixed to the adhesive tape between the film portions, these tapes have, of course, to be supplied at a place located after the place where the film portion is fixed to the adhesive tape. The fixation of this (these) countertape(s) tapes(s) to the adhesive tape(s) then takes place during a standstill of the chain by means of pressing members which press the tapes to one another between two film portions, for example, slide frames.

For the manufacture of a tape of interconnected, framed slides a particular embodiment of a device in accordance with the invention comprises a chain consisting of pivotable, interconnected trays having standing sides remote from the transport rollers, said trays having substantially the same dimensions as a slide frame, whilst the standing sides being at right angles to the direction of movement of the chain have recesses of such dimensions that the adhesive tape and the countertape, if used, fit therein.

BRIEF DESCRIPTION OF THE DRAWING

The invention will now be described more fully with reference to a drawing which shows, by way of example, the manufacture of a tape with slide frames, in which two adhesive tapes and two counter-tapes are used. The drawing shows in FIG. 1 a plan view of a part of a sequential tape, FIG. 2 a side elevation of the tape of FIG. 1, FIG. 3 a device for the manufacture of a tape shown in FIGS. 1 or 2 and FIG. 4 a plan view and a side elevation of a detail of the device of FIG. 4.

DETAILED DESCRIPTION OF THE DRAWINGS

Figure 1:
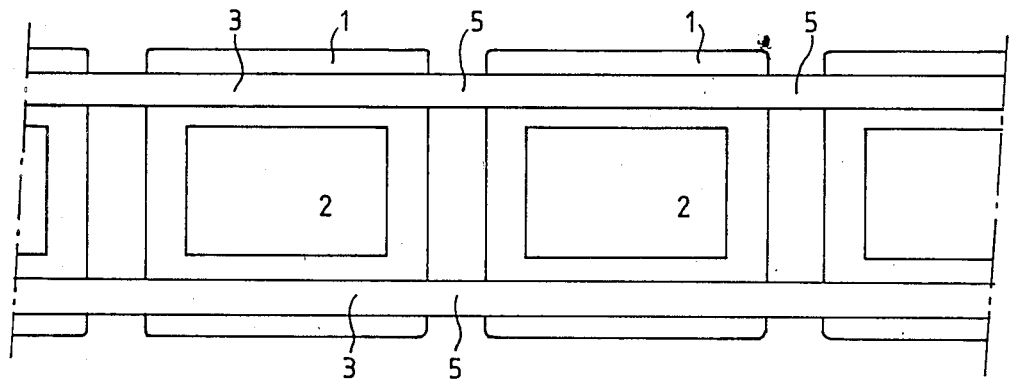
Figure 2:
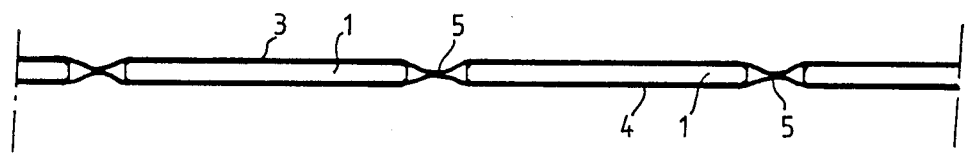

Referring to FIG. 1, reference numeral 1 designates two diapositive frames. The middle parts 2 of the frames comprise the film portions with the picture information. Along the sides of the slide frames 1 extend the tapes 3 on the top side. These tapes are not stuck to the slide frames. On the underside (FIG. 2) tapes 4 extend below the tapes 3. The slide frames 1 are stuck to said 4. The tapes 3 are preferably formed by paper strips and the tapes 4 are preferably synthetic tapes provided with an adhesive. From FIG. 2 it will be apparent that the tapes 3 and 4 are stuck to one another at places 5 between the slide frames. By using flexible tapes 3 and 4 and the intermediate spaces 5 the continuous tape can be folded and even wound. FIG. 2 shows that practically no material is present in the middle between the slide frames. At this place the side of a frame can thus be used as a reference in the printer for assessing the correct place. As stated above, for this purpose a light beam and a photoelectric cell co-operating therewith may be used. The free edges of the slides may furthermore be used in the printer for a simple mode of transport, for example, by means of combs.

Figure 3:
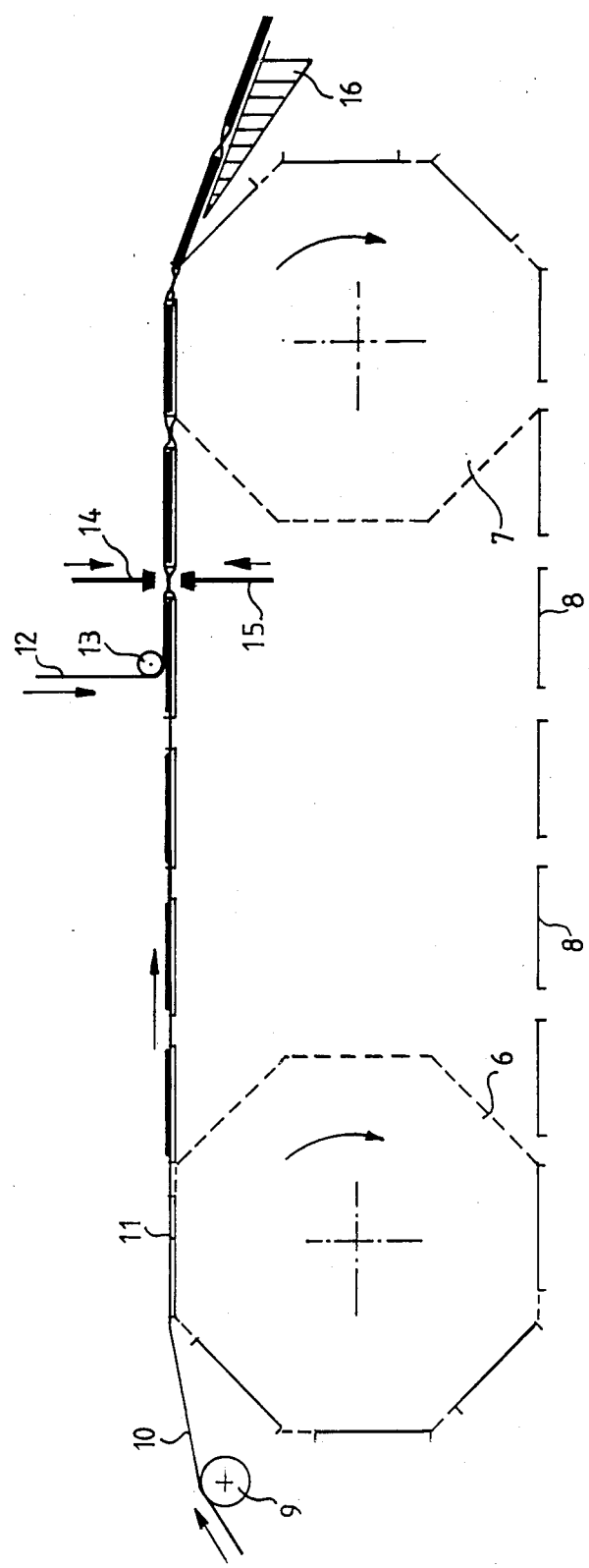

FIG. 3 schematically shows a device embodying the invention for the manufacture of a continuous tape of the kind shown in FIGS. 1 and 2. This device comprises two parallel rollers 6 and 7 having an octagonal section. Along these rollers passes an endless chain consisting of pivotally intercoupled, flat links 8. At the side of the roller 6 a tape 10 having an adhesive on the top side is fed along the roller 9. The rollers 6 and 7 do not rotate continuously, but they are turned stapwise in the direction indicated in a manner such that invariably a portion on the top side stands still in the position 11. In this position a slide frame can be deposited on the tape and be fixed thereto. During the rotation of the rollers 6 and 7 the adhering slides are transported with the tape 10 to the right, that is to say, at each interval through a distance equal to the width of a frame plus the distance between two consecutive frames. At 12 a tape is fed along the roller 13 just above the tape 10. This tape 12 is not provided with adhesive and is preferably formed by a paper strip. Reference numerals 14 and 15 designate two pressing members which fix the tapes 10 and 12 locally one to the other. This is, of course, performed in synchronism with the turn of the rollers 6 and 7, since the tape has to stand still at the instant when the pressing members 14 and 15 approach one another. Reference numeral 16 designates a pick-up member along which the continuous tape moves away to the right.

Figure 4:
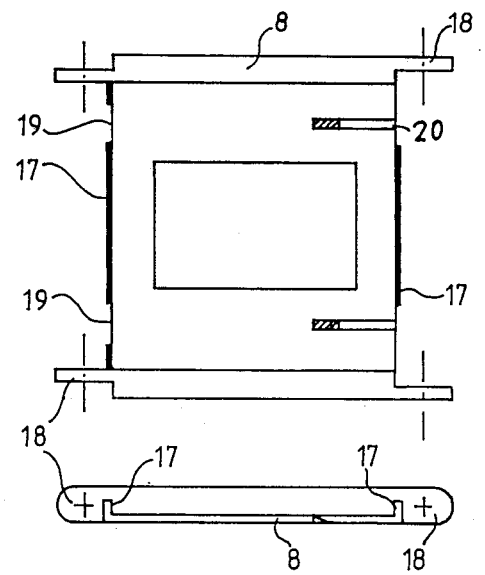

FIG. 4 shows in greater detail the design of the links 8. Essentially they are formed by small trays having upwardly extending rims 17 in which the slide frames are fit. The links are pivotally interconnected in a manner known for chains by means of the off-set parts 18. For allowing the tapes 10 and 12 to pass the rims 17 have recesses 19.

The recess 20 serves to pass the wedge-shaped pick-ups so that they can lift the frame from below out of the tray during the rotation of the polygonal rollers.

The manufacture of a tape of interconnected parts in accordance with the invention provides a cost saving of about 80% as compared with the ladder-shaped strips in accordance with the prior art. In the embodiments of the invention such a ladder-shaped design could be used in a device of the kind shown in FIG. 3.

What is claimed is:
1. A method of manufacturing a tape of spaced, framed, photographic slides to be used in a photographic printing machine, comprising the steps of
   (1) fixedly but removably adhesively fastening each slide frame to two first strips of continuous tape along two parallel side-legs of the frame, each of said first strips having adhesive over their entire length on the side facing the slide frame;
   (2) placing two second strips of continuous tape on the opposite side of said slide from each of said two first strips of tape, whereby each of said second strips is aligned with one of the two first strips; and
   (3) contacting said second strips with the adhesive covered first tape at the intervals between adjacent slides along each of the two side-legs so as to fasten each first and second tape strips together at the intervals.
2. A method as in claim 1 wherein said two second strips are paper.
3. A tape of spaced framed photographic slides manufactured by the method of claim 1.

* * * * *